United States Patent
Ibaraki (10) Patent No.: US 7,814,514 B2
(45) Date of Patent: Oct. 12, 2010

(54) DIGITAL BROADCAST RECEIVING APPARATUS CONFIGURED FOR USE WITH COPY CONTROL INFORMATION

(75) Inventor: Hisami Ibaraki, Osaka (JP)

(73) Assignee: Panasonic Corporation, Osaka (JP)

( * ) Notice: Subject to any disclaimer, the term of this patent is extended or adjusted under 35 U.S.C. 154(b) by 469 days.

(21) Appl. No.: 11/908,016

(22) PCT Filed: Mar. 7, 2006

(86) PCT No.: PCT/JP2006/304338

§ 371 (c)(1),
(2), (4) Date: Sep. 7, 2007

(87) PCT Pub. No.: WO2006/095718

PCT Pub. Date: Sep. 14, 2006

(65) Prior Publication Data

US 2009/0125947 A1    May 14, 2009

(30) Foreign Application Priority Data

Mar. 10, 2005   (JP)   ............................. 2005-066958

(51) Int. Cl.
```
G06F 3/00      (2006.01)
G06F 13/00     (2006.01)
H04N 5/445     (2006.01)
H04N 7/167     (2006.01)
H04N 7/16      (2006.01)
```
(52) U.S. Cl. .................. 725/58; 725/59; 725/40; 380/201; 380/203; 380/234; 726/31; 726/32

(58) Field of Classification Search ............ 725/59, 725/58, 40; 380/201, 203, 234; 726/31, 726/32; 386/40
See application file for complete search history.

(56) References Cited

U.S. PATENT DOCUMENTS 6,298,196 B1 * 10/2001 Shima et al. ................. 386/94
2008/0184327 A1 * 7/2008 Ellis et al. .................... 725/134

FOREIGN PATENT DOCUMENTS

| JP | 10-247362 A | 9/1998 |
| JP | 2003-022610 | 1/2003 |
| JP | 2003-87670 A | 3/2003 |
| JP | 2003-134449 A | 5/2003 |

OTHER PUBLICATIONS

International Search Report for Application No. PCT/JP2006/304338 dated Jun. 13, 2006.

* cited by examiner

Primary Examiner—Hoang-Vu A Nguyen-Ba
(74) Attorney, Agent, or Firm—RatnerPrestia (57) ABSTRACT

A digital broadcasting receiver includes a digital tuning section having a plurality of tuners which receive digital broadcasting and output video signals of programs as well as a copy control signal, and a controller which selects one of video signals supplied from the tuners based on the copy control signal supplied from the digital tuning section. The foregoing structure allows the receiver to output the videos of programs free from intermittence at the beginning of the program of which copy control signal is switched from the previous one.

10 Claims, 8 Drawing Sheets

Mar. 10(Thursday) 12:45

| ch<br>Time | 8ch | 10ch | 12ch | 19ch |
|---|---|---|---|---|
| 13:00 | Program A<br><br>Copy free | Program E | Program I<br><br>Copy free | Program M<br>Copy free |
| 14:00 | Program B<br><br>Copy once | | Program J<br>Copy free | Program N<br>Copy free |
| | | | | Program O<br><br>Copy free |
| 15:00 | Program C<br><br><br><br>Never copy | Copy once | Program K<br><br>Copy once | Program P<br><br><br><br>Copy free |
| | | Program F<br>Never copy | | |
| 16:00 | | Program G<br><br>Never copy | Program L<br><br><br>Copy once | |
| 17:00 | Program D<br><br>Copy free | Program H<br><br>Copy free | | Program R<br><br>Copy free |

FIG. 3

| Date | Time | ch | Program | Copy control information | Tuner assigned |
|---|---|---|---|---|---|
| Mar. 10 | 13:00 ~ 14:00 | 8ch | Program A | Copy free | First tuner |
| Mar. 10 | 14:00 ~ 15:00 | 8ch | Program B | Copy once | Second tuner |
| Mar. 10 | 15:30 ~ 16:00 | 10ch | Program F | Never copy | First tuner |
| Mar. 10 | 16:00 ~ 17:00 | 12ch | Program L | Copy once | Second tuner |
|  |  |  |  |  |  |

DIGITAL BROADCAST RECEIVING APPARATUS CONFIGURED FOR USE WITH COPY CONTROL INFORMATION

THIS APPLICATION IS A U.S. NATIONAL PHASE APPLICATION OF PCT INTERNATIONAL APPLICATION PCT/JP2006/304338.

TECHNICAL FIELD

The present invention relates to a digital broadcasting receiver that can keep outputting video signals even if copy control information is switched to another one during the reception of digital broadcasting.

BACKGROUND ART

The digital broadcasting carries video signals together with a copy control signal which controls whether or not the video signals can be recorded, and when the video signals are permitted to record, how many times they can be recorded. The copy control information obtained from the copy control signal determines whether or not the video signals can be recorded. This technical art is disclosed in, e.g. Unexamined Japanese Patent Publication No. 2003-22610.

The copy control signals include signals of "Copy Free", "Copy Once", and "Never Copy". These signals are transmitted in an electronic program guide information (hereinafter simply referred to as "EPG information") together with program data to be broadcasted. The program now on-air contains video signals with a copy control signal. The digital-broadcasting receiver controls outputting the video signals based on the copy control information.

Figure 8:
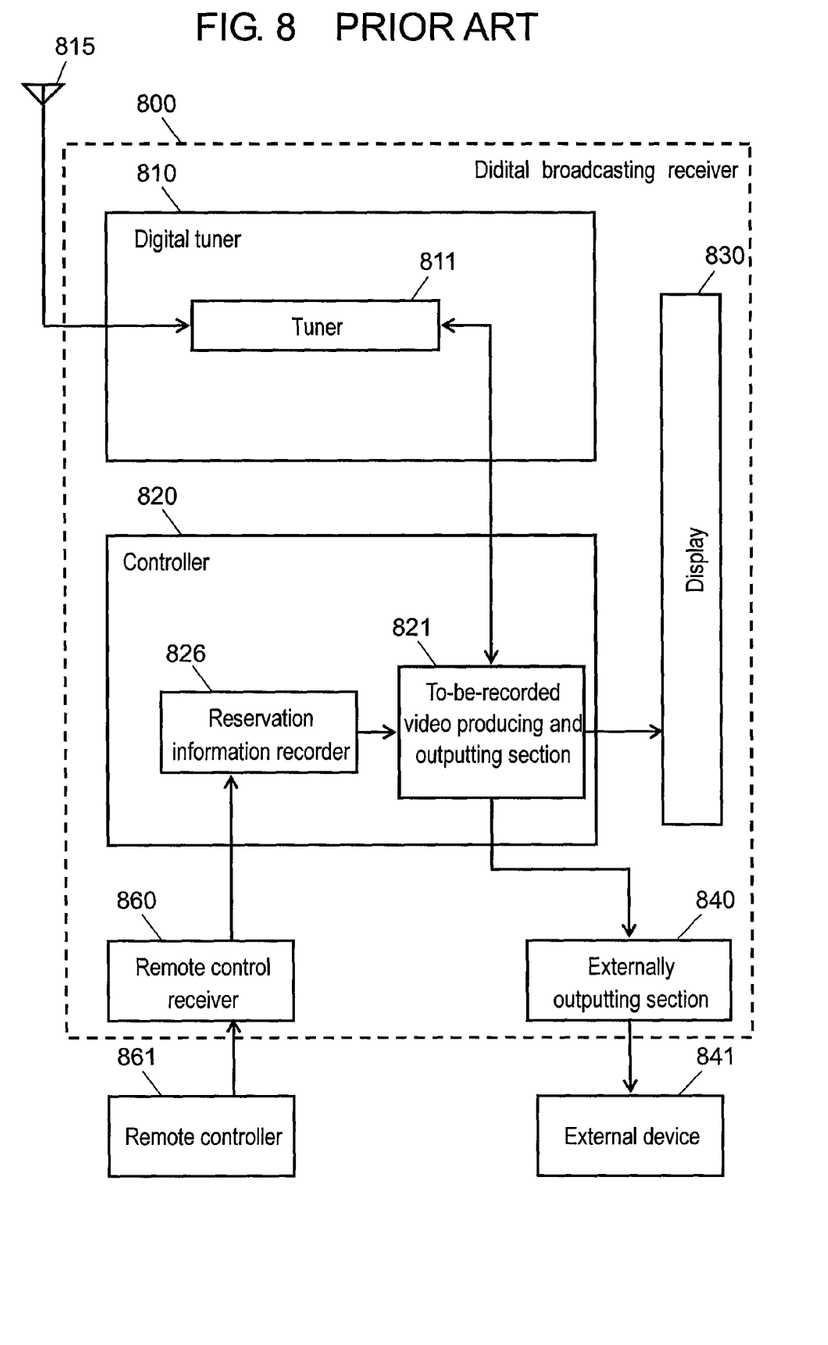
FIG. 8 shows a block diagram illustrating a structure of a conventional digital broadcasting receiver.

FIG. 8 shows a block diagram illustrating a structure of conventional digital broadcasting receiver 800, which includes digital tuner 810, controller 820, display 830, externally outputting section 840, and remote-control receiver 860. Antenna 815, external device 841 and remote controller 861 are connected to receiver 800. Antenna 815 is connected to digital tuner 810 which converts the television broadcasting radio-wave caught by antenna 815 into video signals and outputs the signals to controller 820, which then outputs the signals to display 830 and externally outputting section 840.

Using remote controller 861, a user reserves a program for watching or for an unattended recording. At this time, controller 820 inputs the reservation information about the preselected programs via remote-control receiver 860, and reservation information memory 826 stores the information such as the date, time and the channel of the program to be recorded.

When the designated hour recorded in memory 826 comes, to-be-recorded video producing and outputting section 821 instructs tuner 811 to switch the channel, so that tuner 811 supplies the video of the program to video producing and outputting section 821 for forming video data to be recorded. Then section 821 outputs the video signals to display 830 and also externally outputting section 840.

However, when a copy control signal of a video signal in reception is switched to another one, a conventional digital broadcasting receiver produces to-be-recorded video data and processes the output of the video signal in accordance with this another copy control signal, so that intermittence is obliged to occur in the video for one-two seconds.

For instance, in the case of recording two consecutive programs, a first program comes with a "Copy Free" signal and the second one comes with a "Copy Once" signal. In this case, when the first program is switched to the second one, an output process of the video signals is also switched from "Copy Free" to "Copy Once", so that the supply of video signals is halted for one-two seconds during the production of the to-be-recorded video data. As a result, the second program loses the video at its very first part, and the user sometimes misses the title of the second program.

As discussed above, when the copy control information attached to video signals supplied from the digital tuner is switched to another copy control information, the conventional digital broadcasting receiver must switch the output process set in the digital tuner about video signals to another one. Thus the conventional receiver is obliged to halt the video output temporarily, then switch the output process to another one in accordance with this another copy control information before restarting the video output.

DISCLOSURE OF INVENTION

The present invention aims to provide a digital broadcasting receiver which can keep outputting videos to a built-in video recorder and external devices such as a recording device and a display device even if copy control information is switched to another one during the video output of digital broadcasting.

A digital broadcasting receiver of the present invention includes the following elements:

a digital tuning section having a plurality of tuners for receiving digital broadcasting, and outputting video signals of a received program and copy control information; and a controller for selecting one of video signals supplied from the tuners based on a copy control signal supplied from the digital tuning section.

The present invention allows the receiver to keep outputting videos to the built-in video recorder and external devices such as the recording device and the display device even if copy control information is switched to another one during the video output of digital broadcasting. As a result, when a copy control signal is switched over to another one, the program with this another copy control signal can keep going free from losing videos at its beginning.

DESCRIPTION OF THE REFERENCE MARKS 100 digital broadcasting receiver
110 digital tuning section
111 first tuner
112 second tuner
113 third tuner
115 antenna
120 controller
121 first to-be-recorded video producing section
122 second to-be-recorded video producing section
123 third to-be-recorded video producing section
124 tuner switcher
125 copy control information decoder
126 reservation information recorder
130 display
140 externally outputting section
141 external device
150 video recorder
160 remote control receiver
161 remote controller

PREFERRED EMBODIMENT OF THE INVENTION

An exemplary embodiment of the present invention is demonstrated hereinafter with reference to the accompanying drawings.

Exemplary Embodiment 1

Figure 1:
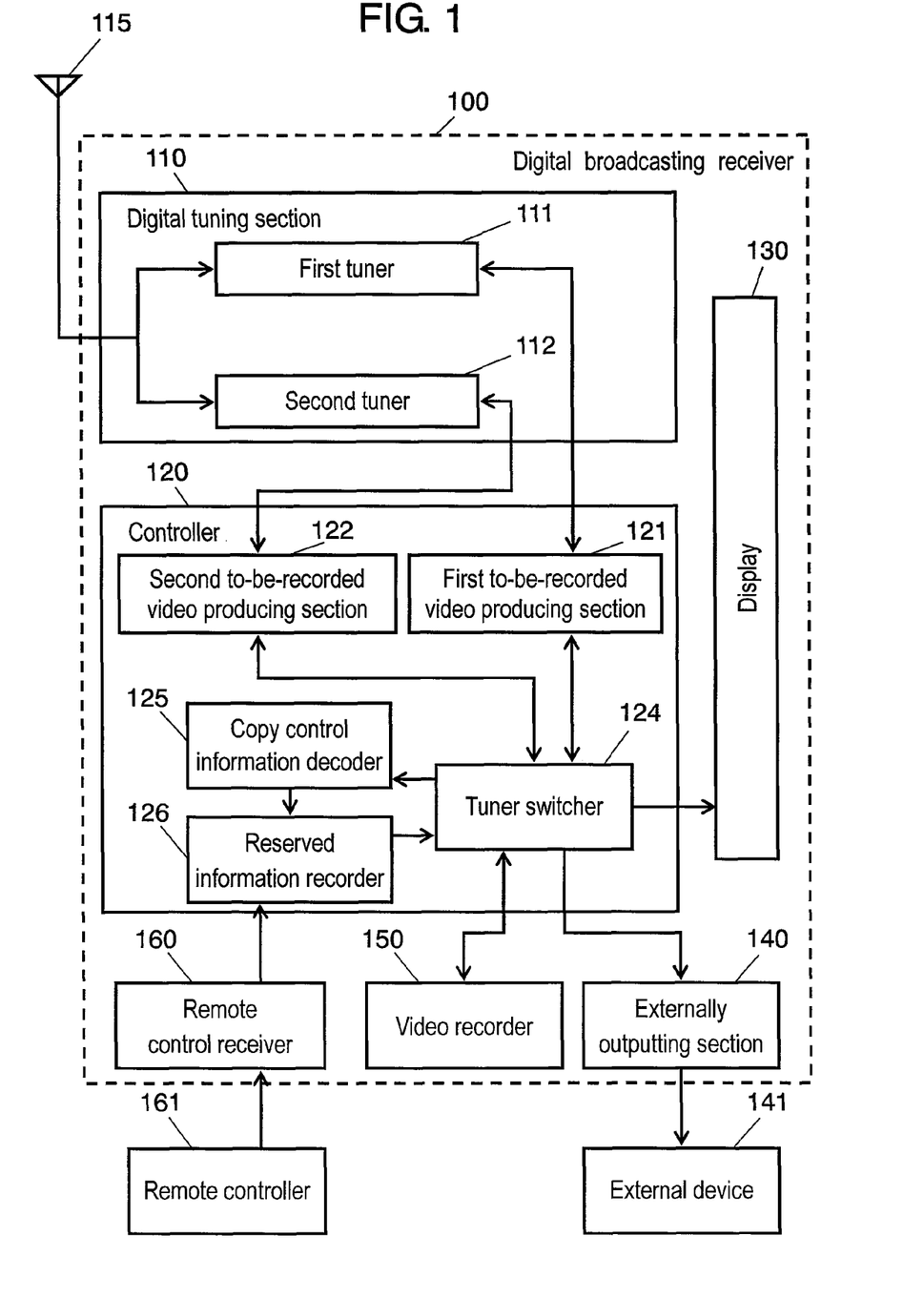
FIG. 1 shows a block diagram illustrating a structure of a digital broadcasting receiver in accordance with a first embodiment of the present invention.

FIG. 1 shows a block diagram illustrating a structure of digital broadcasting receiver 100 in accordance with the first embodiment of the present invention. As shown in FIG. 1, receiver 100 comprises the following elements: digital tuning section 110, controller 120, display 130, externally outputting section 140, video recorder 150, and remote control receiver 160. Antenna 115, external device 141 and remote controller 161 are coupled to receiver 100.

Antenna 115 is coupled to digital tuning section 110, which converts the television broadcasting radio-wave caught by antenna 115 to video signals, and outputs the video signals to controller 120. Tuning section 110 also extracts EPG information out of the television broadcasting radio-wave, and outputs the information to controller 120. Digital tuning section 110 includes first tuner 111 and second tuner 112. When a program is watched in a regular manner, first tuner 111 serves and outputs video signals to controller 120. Controller 120 prompts second tuner 112 to serve when two programs are to be displayed simultaneously on a screen or consecutive programs having different copy-control signals are to be reserved for watching or recording.

Figure 2:
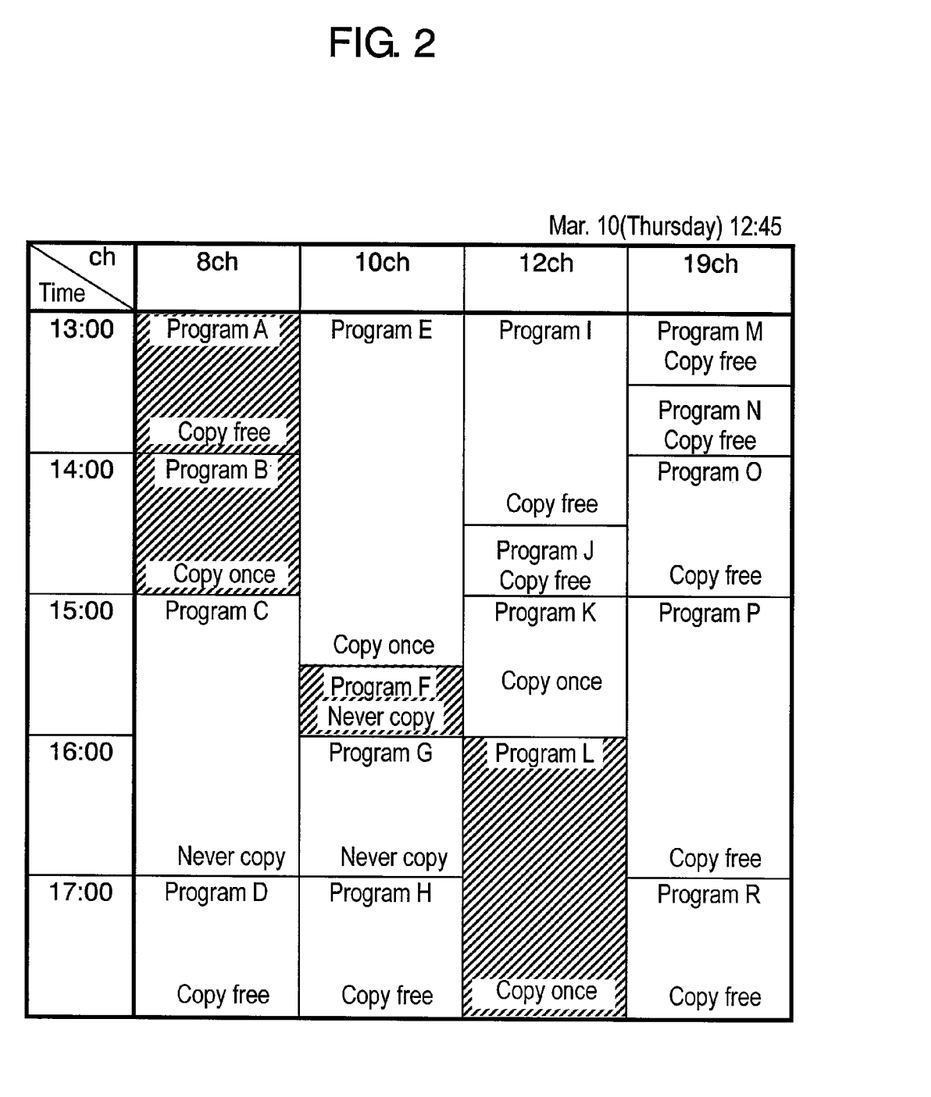
FIG. 2 shows an instance of EPG (electronic program guide) information in accordance with the first embodiment of the present invention.

FIG. 2 shows an instance of EPG (electronic program guide) information in accordance with the first embodiment of the present invention. In FIG. 2, program A on channel 8 is scheduled on-air from 13:00 to 14:00, and program B is scheduled on-air from 14:00 to 15:00. Program A comes with a copy-control signal of "Copy Free" while program B comes with "Copy Once". Controller 120 instructs first tuner 111 to output program A and second tuner 112 to output program B. Digital tuning section 110 outputs video signals to controller 120 via first tuner 111 during program A, i.e. from 13:00 until 14:00, and outputs video signals to controller 120 via second tuner 112 when program B starts, i.e. at 14:00. At this time, second tuner 112 starts outputting video signals from 13:59 following the instruction from controller 120 in order to output the video signals in accordance with "Copy Once" condition.

Controller 120 comprises the following elements: first to-be-recorded video producing section 121, second to-be-recorded video producing section 122, tuner switcher 124, copy control information decoder 125, and reservation information recorder 126.

First to-be-recorded video producing section 121 receives video signals from first tuner 111, and produces the to-be-recorded video data in accordance with the copy control signal, then outputs the data to tuner switcher 124. In a similar manner, second to-be-recorded video producing section 122 receives video signals from second tuner 112, and produces the to-be-recorded video data in accordance with the copy control signal, then outputs the data to tuner switcher 124. In other words, controller 120 includes the same quantity of the to-be-recorded video producing sections as the quantity of tuners in digital tuning section 110.

Tuner switcher 124 gives an instruction to digital tuning section 110 that which tuner, namely, first tuner 111 or second tuner 112, should be used for outputting video signals, and then receives the to-be-recorded video data which has been supplied from digital tuning section in the form of video signals and is produced by one of first to-be-recorded video producing section 121 or second one 122 in accordance with the copy information. Then switcher 124 outputs the video data to display 130, externally outputting section 140, and video recorder 150. As a result, the video signals of program B shown in FIG. 2 and starting at 14:00 can be output free from intermittence in videos at its beginning.

Copy control information decoder 125 receives EPG information supplied from digital tuning section 110, and decodes the copy control information contained in the EPG information, which includes "Copy Free", "Copy Once", "Never Copy" and so on as shown in FIG. 2. Decoder 125 outputs respective copy control information, which attaches to each one of programs now on-screen or to be scheduled on-air, to reservation information recorder 126.

When a user reserves a program for watching or recording with remote controller 161, the program reservation information is input to controller 120 via remote control receiver 160, and the information is stored in reservation information recorder 126. On top of that, copy control information supplied from copy control information decoder 125 is assigned to the reserved program. Recorder 126 stores the information shown in FIG. 3 such as the date, time, channel, program title, and copy control information of the reserved program.

When reservation information recorder 126 determines that consecutive programs have different copy control information, recorder 126 decides which tuner and which to-be-recorded video producing section should output the video signals of the first program, and which ones should output the video signals of the second program. Recorder 126 gives the instruction about switching the tuner to digital tuning section 110 via tuner switcher 124.

For instance, program A and program B to be on-air consecutively with different copy control information, and program F and program L to be on-air consecutively as well with different copy control information, are reserved. In this case, first to-be-recorded video producing section 121 and second to-be-recorded video producing section 122 must produce the to-be-recorded data in accordance with the copy control signals based on the video signals supplied from digital tuning section 110 before outputting video signals. If an output of the video signals is assigned to only one tuner, the video output must be halted for one-two seconds at the moment when the copy control signal is switched to the other one, e.g. at 14:00 when program A is switched over to program B, and at 16:00 when program F is switched over to program L, because the control over the video output is switched to another one. In order to avoid this phenomenon, programs A and F are assigned to first tuner 111 and first to-be-recorded video producing section 121 for outputting their video signals, and programs B and L are assigned to second tuner 112 and second to-be-recorded video producing section 122 for outputting their video signals. When the video signals of programs B and L are output from second tuner 112, the video signals, which have been processed in accordance with the copy control information proper to these programs, are output one minute before the respective on-air times of the programs.

Figure 3:
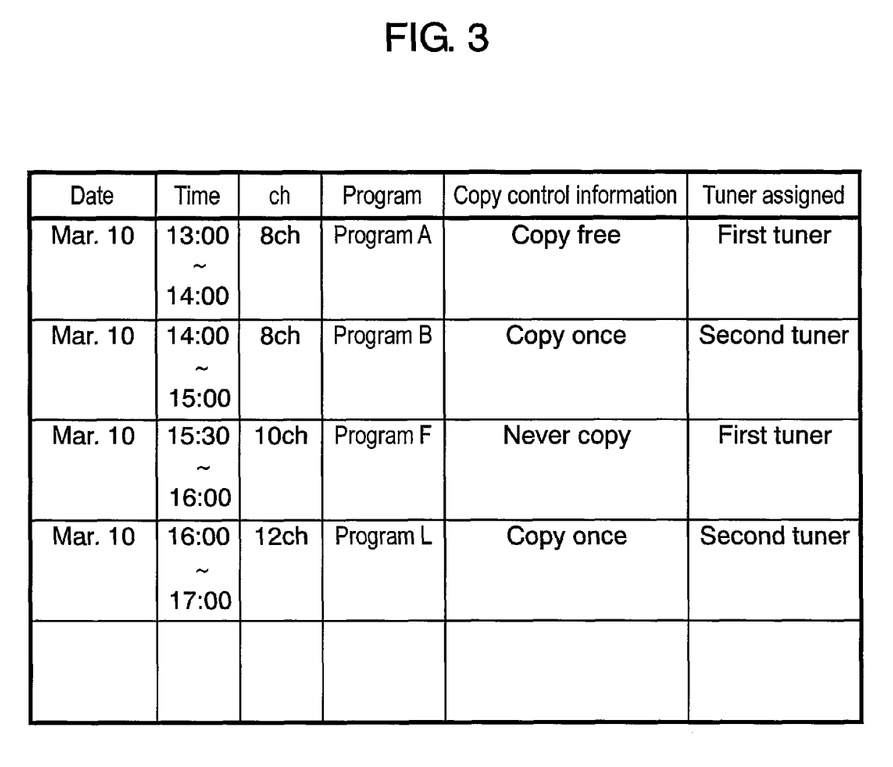
FIG. 3 shows the information of reservation information of programs in accordance with the first embodiment of the present invention.

Display 130 displays the video signals supplied from digital tuning section 110, or displays the videos of the programs based on the EPG information shown in FIG. 2 and received from controller 120, or displays the reservation information as shown in FIG. 3.

Externally outputting section 140 outputs the video signals supplied from digital tuning section 110 via controller 120, and outputs them to external device 141. At this time, a copy control signal goes together with the video signals to external device 141, thereby controlling over the program recording done by device 141.

External device 141 such as a VCR, or a DVD recorder is coupled to externally outputting section 140, through which external device 141 receives the video signals of digital broadcasting received by digital broadcasting receiver 100. If the video signals come with the copy control information other than "Never Copy", external device 141 can record the video signals. In this instance, since program F comes with the copy control information of "Never Copy", program F cannot be recorded by external device 141.

Video recorder 150 is a recording device such as a hard disk built in digital broadcasting receiver 100 for recording programs. It receives the video signals supplied from digital tuning section 110 via controller 120, and records the programs coming with the copy control information of "Copy Free" or "Copy Once". In the foregoing instance, program F is not recorded by video recorder 150. Following a playback instruction from remote controller 161, recorder 150 reproduces the recorded program on display 130 via tuner switcher 124. This reproduction on display 130 is carried out regardless of the copy control information of the program.

Remote control receiver 160 receives a control signal on an infrared ray issued from remote controller 161 placed outside receiver 100, and transmits the control signal to controller 120. Following the control signal issued from remote controller 161, controller 120 implements the control over reservation of programs for watching or recording in addition to general matters such as channel switch, EPG display, and so on.

Figure 4:
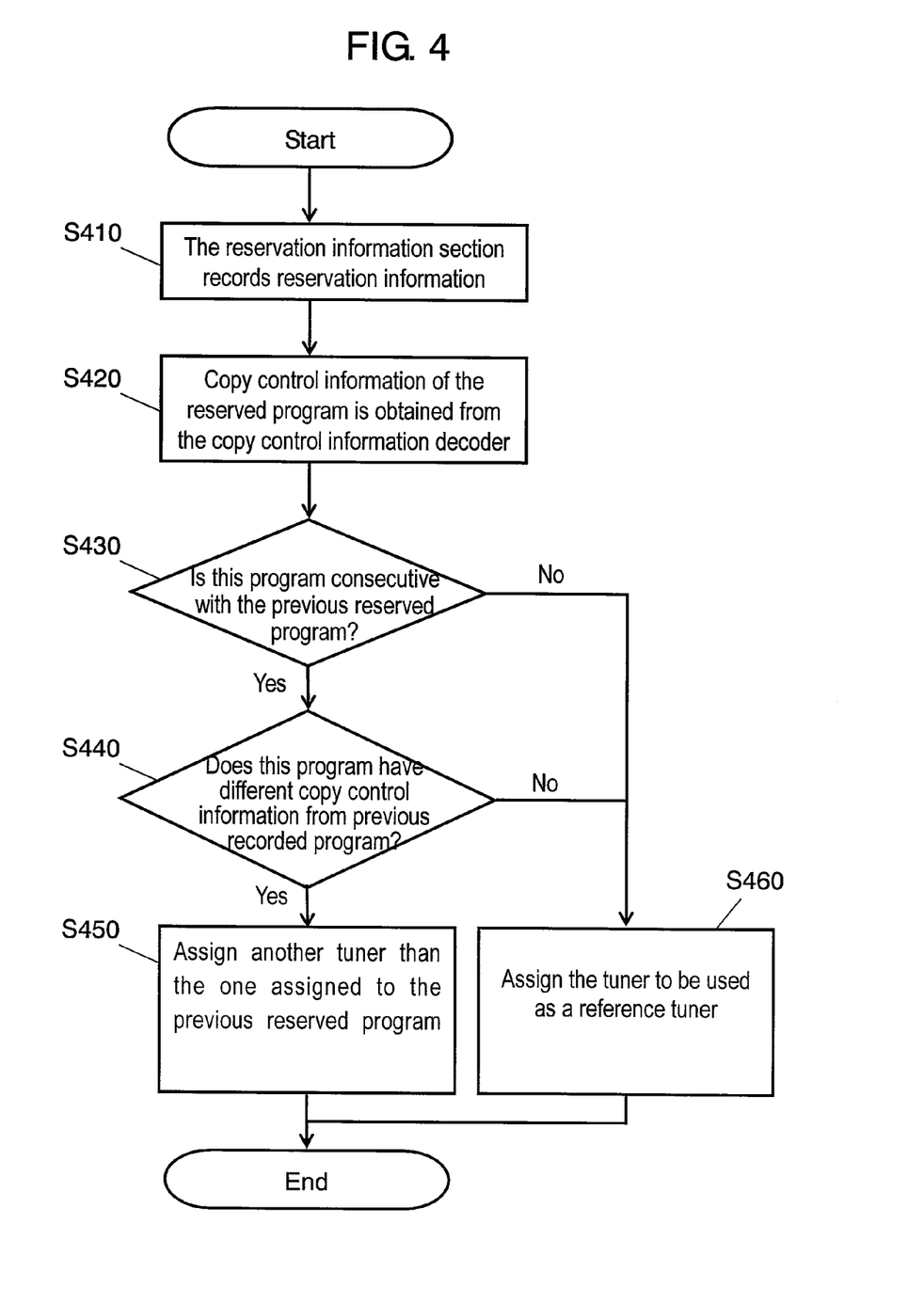
FIG. 4 shows a flowchart of reserving programs in accordance with the first embodiment of the present invention.

FIG. 4 shows a flowchart illustrating an unattended recording of a program by digital broadcasting receiver 100 in accordance with the first embodiment of the present invention. The procedure for reserving a program is demonstrated hereinafter with reference to FIG. 4.

[1] A user reserves programs for watching or recording with remote controller 161, then controller 120 records the date, time, channel, and title of each one of the programs as reservation information in reservation information recorder 126 (S410).

[2] Copy control information decoder 125 decodes the EPG information supplied from digital tuning section 110 for obtaining copy control information, and outputs the information to reservation information recorder 126, which then obtains a piece of copy control information corresponding to the reserved program out of various copy control information supplied from decoder 125 based on the reservation information recorded in recorder 126 such as the date, time, channel, title of the program (S420).

[3] When a plurality of programs are recorded, check if there are programs to be consecutively on-air (S430).

[4] When no consecutive programs exist, set first tuner 111 of digital tuning section 110 as a reference tuner to be used (S460).

[5] In step S430, if a program is consecutive to its previous reserved program, check if this program has different copy control information from the previous reserved program (S440).

[6] When the program has different copy control information from the previous reserved program, set another tuner for this program than the tuner to be used for the previous reserved program (S450). This is because it is necessary to switch the tuner to another tuner in digital tuning section 110 in order to avoid generating intermittence in video signals due to switching the copy control signal to another one. For instance, as shown in FIG. 3, program A and program B are consecutive with different copy control signals, and program F and program L are also consecutive with different copy control signals, so that the tuner to be used for programs B and L is assigned to second tuner 112 different from first tuner 111 to be used for programs A and F.

[7] In step S440, when the program has the same copy control information as the previous reserved program, first tuner 111 in digital tuning section 110 is assigned as the reference tuner to be used (S460).

The flow of the steps discussed above allows recording the reservation information including the date, time, channel, title, copy control information, and tuner assigned to the reserved program, in reservation information recorder 126.

Figure 5:
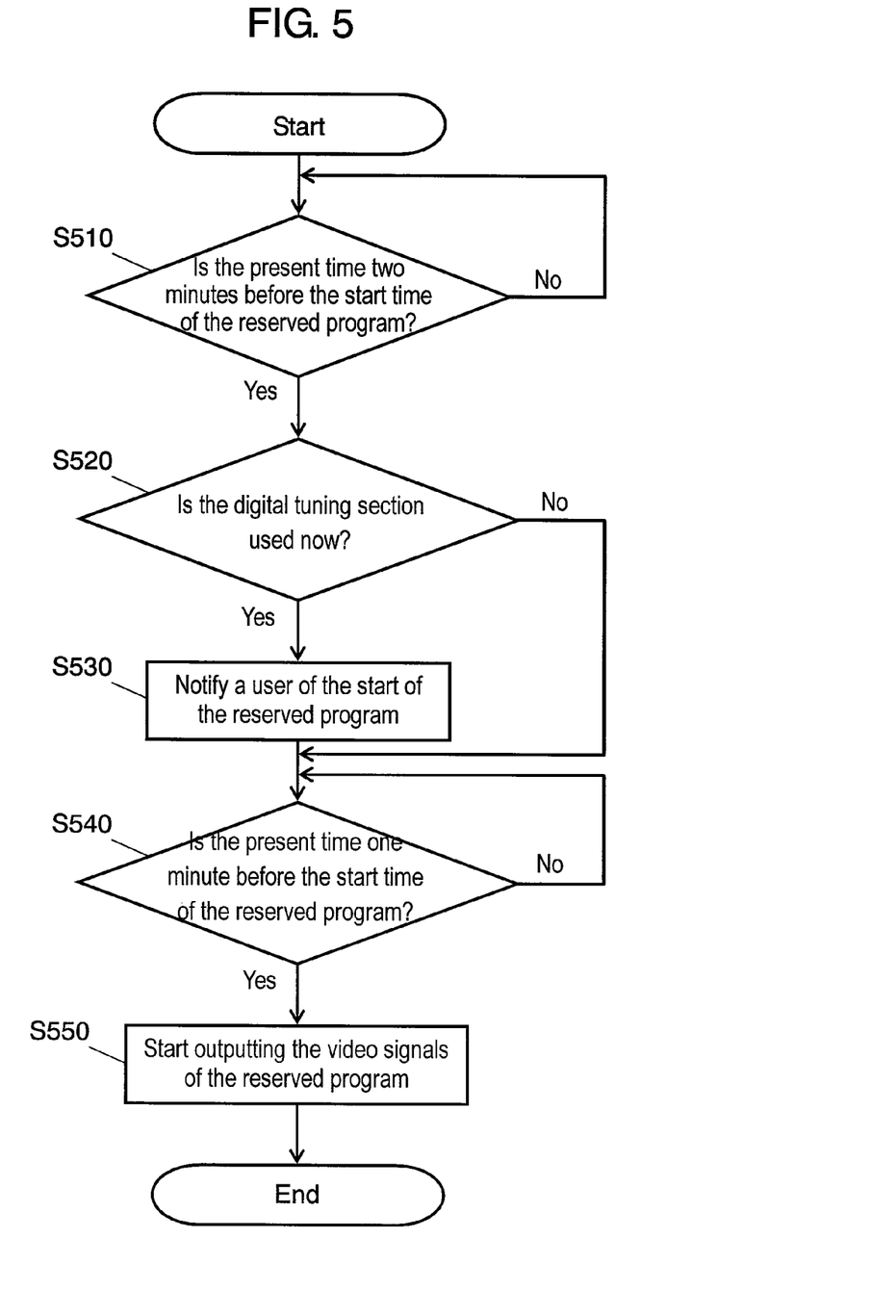
FIG. 5 shows a flowchart illustrating how to implement the reserved content in accordance with the first embodiment of the present invention.

FIG. 5 shows a flowchart illustrating how to implement the reserved content in accordance with the first embodiment of the present invention. The implementation process is demonstrated hereinafter with reference to FIG. 5.

[1] Check the reservation information recorded in recorder 126, and check if the present time is two minutes before the start time of the reserved program closest to the present time. If the present time is more than two minutes before the start time, wait until the time comes to two minutes before the start time (S510). For instance, in FIG. 3, at the present, the reserved program closest to the start time is program A starting at 13:00, so that check if the present time is 12:58.

[2] When the present time comes to two minutes before the start time of the reserved program, check whether or not the tuner of digital tuning section 110 is in use (S520), if no tuner is used, move on to step S540 with no action.

[3] When digital tuning section 110 is used, controller 120 prompts display 130 to make notice to a user that the reserved program starts soon (S530). This notice is kept displaying until the present time comes to one minute before the start time.

[4] Check if the present time is one minute before the start time of the reserved program (S540).

[5] When the present time comes to one minute before the start time, the tuner assigned to the reserved program recorded in the reservation information starts outputting video signals (S550). For instance, in FIG. 3, the output of the video signals of program A starts at 12:59 and is supplied to tuner switcher 124.

The flow of steps discussed above allows implementing the reserved content.

Figure 6:
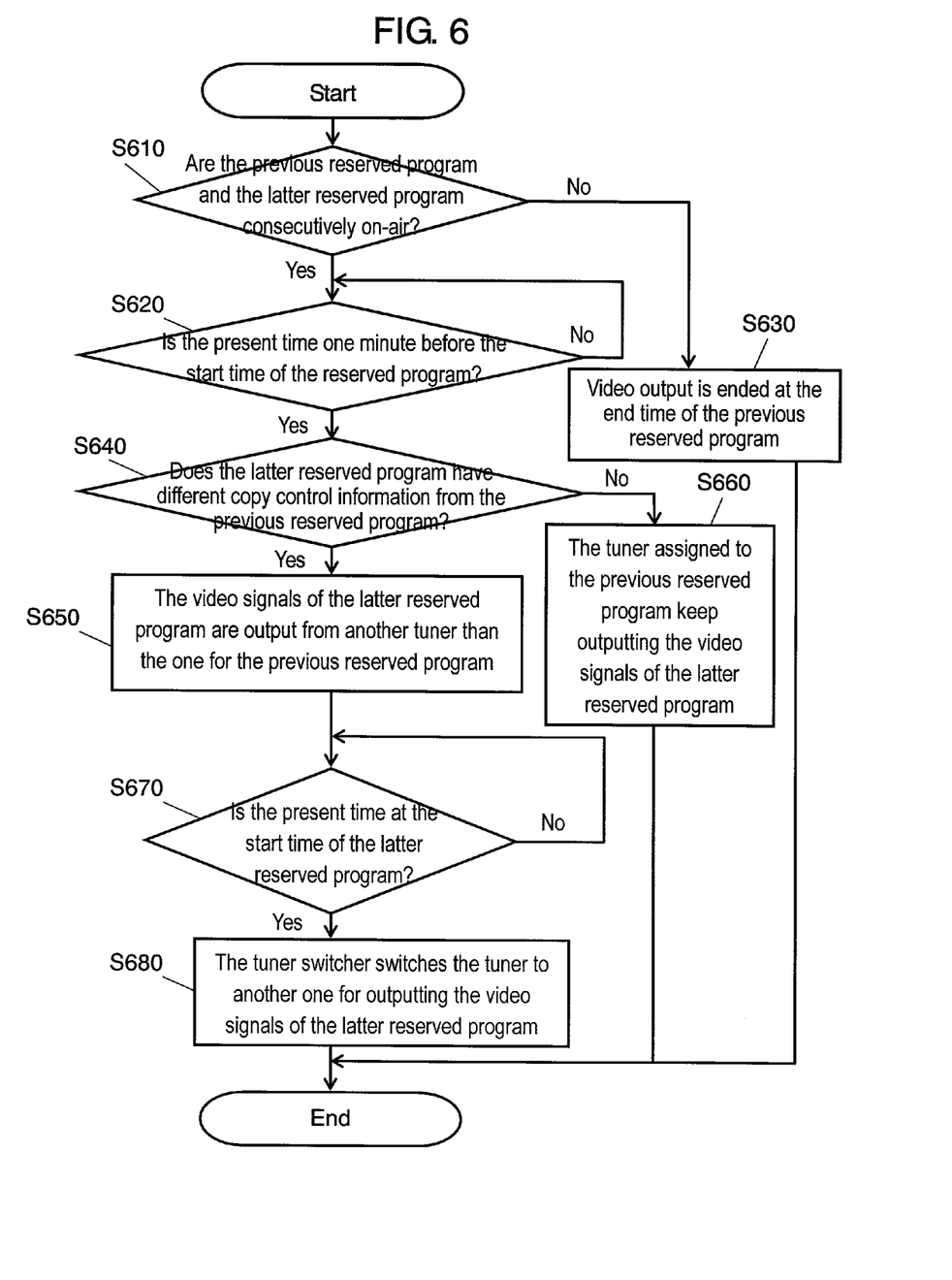
FIG. 6 shows a flowchart illustrating a switch process of the tuning section in accordance with the first embodiment of the present invention.

FIG. 6 shows a flowchart illustrating a switch process in the tuning section in accordance with the first embodiment of the present invention. A process flow of switching in the tuning section of the present invention is demonstrated hereinafter with reference to FIG. 6. The program of which video is output at the start in FIG. 6 is referred to "the previous reserved program", and the other program consecutively starting after the previous reserved program is referred to as "the latter reserved program".

[1] After the output of the video signal of the previous reserved program is started, check the reservation information recorded in reservation information recorder 126 to find whether or not the previous reserved program is consecutively on-air with the latter reserved program (S610).

[2] When the previous reserved program is not consecutively on-air with the latter one, the video output is finished at the end of the previous reserved program (S630).

[3] In step S610, when the latter reserved program is to be consecutively broadcasted after the previous reserved program, check whether or not the present time is one minute before the start time of the latter reserved program (S620). For instance, in FIG. 3, previous reserved program A is consecutive with later reserved program B, then check whether or not the present time is one minute before (13:59) the start time (14:00) of program B. If the present time is not yet one minute before the start time, wait until the present time comes to the one minute before the start time of the latter reserved program.

[4] When the present time comes to one-minute before the start time of the latter reserved program, check if the latter reserved program has different copy control information from the previous one (S640).

[5] In step 640, if the latter reserved program has the same copy control information as the previous one, keep using the tuner having been used for the previous reserved program (S660).

[6] In step 640, if the latter reserved program has different copy control information from the previous one, assign another tuner than the tuner having been used for the previous reserved program to the latter reserved program, and start outputting video signals, supplied by the to-be-recorded video producing section, from this another tuner (S650). This is because of the determination that the tuner in digital tuning section 110 should be switched to another one in order to avoid intermittence in the video signals due to the change of the copy control signal. Thus another tuner than the tuner having been used for the previous reserved program is assigned, and the video signals supplied by the to-be-recorded video producing section are output from this another tuner. For instance, in FIG. 3, when the previous reserved program is switched over to the latter reserved program, the tuner to be used is switched over from first tuner 111 to second tuner 112 of digital tuning section 110, and then second tuner 112 starts outputting the video signals supplied by second to-be-recorded video producing section 122.

[7] Check if the present time comes to the on-air start time of the latter reserved program (S670). For instance, in FIG. 3, check if the present time is the on-air start time (14:00) of latter reserved program B. When the present time is at the on-air start time of the latter reserved program, wait until the present time comes to the start time.

[8] When the present time comes to the start time of the latter reserved program, tuner switcher 124 switches the tuner outputting the video signals of the previous reserved program to another tuner outputting the video signals of the latter reserved program (S680).

The foregoing flow of the steps allows executing the switchover process in the digital tuning section. Even if copy control information is switched to another one while video signals of digital broadcasting are output, the structure discussed above allows the built-in video recorder and the external devices such as a recorder and a display to keep outputting the video signals.

Figure 7:
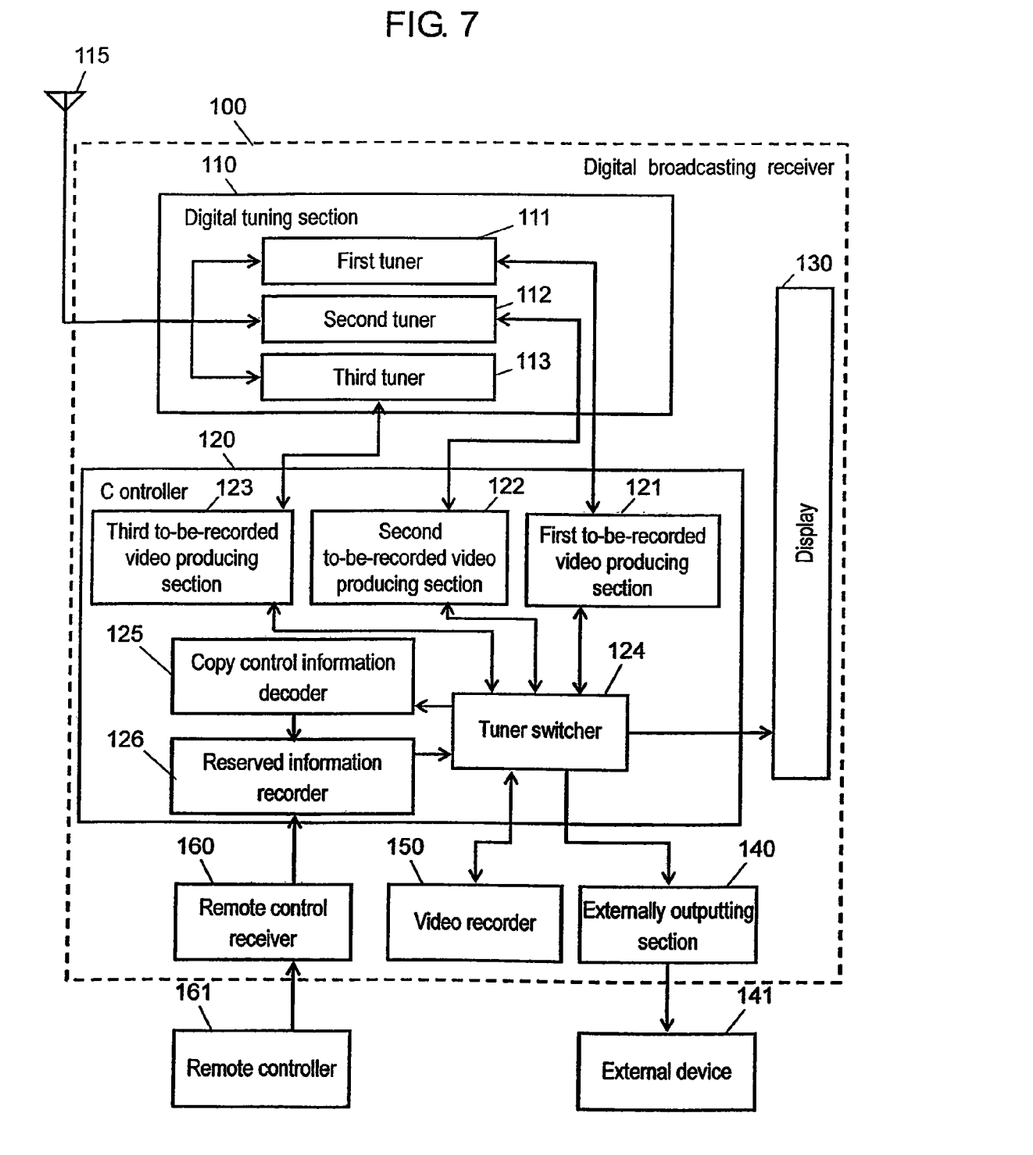
FIG. 7 shows a block diagram of a digital broadcasting receiver which includes three tuners in accordance with the first embodiment of the present invention.

In this embodiment, the digital tuning section includes the first tuner and the second tuner; however, it can include three or more than three tuners as shown in FIG. 7. In the case of three tuners available, while a first tuner engages in recording a program, consecutive two programs on a different channel in the same time-slot are to be recorded, and these two programs have different copy control information from each other. In this case, a second tuner is used for outputting the previous program of these two consecutive programs, and a third tuner is used for outputting the latter program, so that the beginning of the latter program is not missed.

In this embodiment, at the switchover of the tuner, the tuner starts outputting video signals one minute before the start time of a program; however, if the tuner can steadily output the video signals for a certain period, the tuner can start outputting the video signals longer than or shorter than one minute before the start time of the program.

In this embodiment, the previous reserved program is assigned to the first tuner, i.e. the reference tuner, and the first to-be-recorded video producing section, and the latter reserved program is assigned to the second tuner and the second to-be-recorded video producing section. However, a program having a copy control signal of "Copy Free" or "Never Copy" can be assigned to the first tuner and the first to-be-recorded video producing section, and a program having a copy control signal of "Copy Once" can be assigned to the second tuner and the second to-be-recorded video producing section. As such, which tuner to be used and which to-be-recorded video producing section to be used are determined in advance based on a type of copy control information, then the tuner and the to-be-recorded video producing section optimum for respective types of copy control information can be used.

INDUSTRIAL APPLICABILITY

A digital broadcasting receiver of the present invention allows outputting videos continuously to a built-in video recorder and a display as well as to external devices coupled to this receiver even if copy control information is switched to another one during the reception of digital broadcasting. Therefore, a program having a copy control signal different from a previous one can be displayed without missing videos at the beginning of the program. The present invention is thus useful for digital broadcasting receivers that can output videos continuously even if copy control information is switched to another one during the reception of digital broadcasting.

The invention claimed is:

1. A digital broadcasting receiver comprising:
a digital tuning section including a plurality of tuners for receiving digital broadcasting and outputting a video signal of first and second consecutive programs and first and second copy control signals associated with the first and second consecutive programs, respectively, the first and second copy control signals included in EPG (electronic program guide) information; and a controller for selecting one or more of the plurality of tuners, to which of the one or more selected tuners the video signal of the first and second consecutive programs is input, based on the first and second copy control signals supplied from the digital tuning section, wherein the controller determines whether the first and second copy control signals indicate a common copy mode for the first and second consecutive programs such that: (1) when the copy control signals indicate the common copy mode, the first and second consecutive programs are input to one of the plurality of tuners, and (2) when the copy control signals do not indicate the common copy mode, the first program of the first and second consecutive programs is input to the one of the plurality of tuners and the second program of the first and second consecutive programs is input to another one of the plurality of tuners.

2. The digital broadcasting receiver of claim 1, wherein the controller includes:

a reservation information recorder for recording reservation information in advance about a program designated by a user;

a copy control signal decoder for decoding the first and second copy control signals of the first and second programs received by the digital tuning section; and a tuner switcher for selecting between the one or more of the plurality of tuners.

3. The digital broadcasting receiver of claim 2, wherein the controller further includes an identical quantity of to-be-recorded video producing sections to a quantity of the tuners, each one of which to-be-recorded video producing sections produces a to-be-recorded video in accordance with the copy control signals based on the video signals of the programs supplied from the plurality of tuners.

4. The digital broadcasting receiver of claim 3, wherein when a consecutive plurality of programs are received and the reservation information recorder detects that the copy control signals, decoded by the copy control signal decoder, of the plurality of programs are different from each other, the reservation information recorder switches a tuner, from which video signals of the plurality of programs are supplied to the tuner switcher, to another tuner at a given time.

5. The digital broadcasting receiver of claim 4, wherein the plurality of programs are received based on the reservation information recorded in the reservation information recorder.

6. The digital broadcasting receiver of claim 5, wherein the reservation information is EPG (electronic program guide) information received by the digital tuning section.

7. The digital broadcasting receiver of claim 5, wherein the copy control signals include EPG (electronic program guide) information received by the digital tuning section.

8. The digital broadcasting receiver of claim 4, wherein the given time is a predetermined time before the first program is switched to the second program that is received consecutively following the first program.

9. The digital broadcasting receiver of claim 8, wherein the given time is one minute.

10. The digital broadcasting receiver of claim 4, wherein a video signal, selected from video signals of the plurality of programs which are input to the tuner switcher, is a previous reserved program of consecutive programs to be received, and a video signal of another program out of the plurality of programs is a later reserved program of the consecutive programs to be received.

* * * * *